United States Patent
Krten

(10) Patent No.: US 9,798,867 B2
(45) Date of Patent: Oct. 24, 2017

(54) TECHNIQUES FOR VIRTUALIZATION AS INTERPROCESS COMMUNICATION, SYNCHRONIZATION AND CODE OBFUSCATION

(71) Applicant: Cisco Technology, Inc., San Jose, CA (US)

(72) Inventor: Robert Krten, Kanata (CA)

(73) Assignee: Cisco Technology, Inc., San Jose, CA (US)

(*) Notice: Subject to any disclaimer, the term of this patent is extended or adjusted under 35 U.S.C. 154(b) by 458 days.

(21) Appl. No.: 13/910,265

(22) Filed: Jun. 5, 2013

(65) Prior Publication Data
US 2014/0366017 A1   Dec. 11, 2014

(51) Int. Cl.
G06F 9/455    (2006.01)
G06F 21/14    (2013.01)

(52) U.S. Cl.
CPC .......... *G06F 21/14* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 6,961,806 B1* | 11/2005 | Agesen et al. | 711/6 |
| 7,996,520 B2 | 8/2011 | Weil et al. | |
| 8,239,836 B1* | 8/2012 | Franz et al. | 717/127 |
| 8,316,236 B2 | 11/2012 | McGrew et al. | |
| 2005/0108562 A1* | 5/2005 | Khazan | G06F 11/3604 726/23 |
| 2006/0259734 A1* | 11/2006 | Sheu et al. | 711/203 |
| 2006/0259818 A1* | 11/2006 | Howell | G06F 11/1484 714/21 |
| 2009/0248611 A1* | 10/2009 | Xu et al. | 707/1 |
| 2013/0132690 A1 | 5/2013 | Epstein | |

OTHER PUBLICATIONS

Raffetseder. Detecting System Emulators. [online] (2007). Springer., pp. 1-18. Retrieved From the Internet <http://citeseerx.ist.psu.edu/viewdoc/download?doi=10.1.1.68.629&rep=rep1&type=pdf>.*
Baiardi et al. An Obfuscation-Based Approach Against Injection Attacks. [online] (2011). IEEE., pp. 51-58. Retrieved From the Internet <http://www.iit.cnr.it/sites/default/files/06045938.pdf>.*
Adams et al. A Comparison of Software and Hardware Techniques for x86 Virtualization. [online] (2006). ACM., pp. 1-12. Retrieved From the Internet <http://embedded.cse.iitd.ernet.in/~sbansal/os/previous_years/2012/bib/adams06comparison.pdf>.*

* cited by examiner

*Primary Examiner* — Emerson Puente
*Assistant Examiner* — Jonathan R Labud
(74) *Attorney, Agent, or Firm* — Edell, Shapiro & Finnan, LLC

(57) ABSTRACT

Techniques are presented for obfuscating programs of virtual machines. On a virtual machine hosted by a physical device, a program is run that is configured to execute one or more operations. At a virtual machine manager hosted by the physical device and configured to manage the virtual machine, execution of the program is monitored to detect a trapping event that causes the virtual machine manager to take over operation of the program. Upon detecting the trapping event, a specific operation of the program is performed that differs from an operation implied by static analysis of the program.

18 Claims, 7 Drawing Sheets

US 9,798,867 B2

TECHNIQUES FOR VIRTUALIZATION AS INTERPROCESS COMMUNICATION, SYNCHRONIZATION AND CODE OBFUSCATION

TECHNICAL FIELD

The present disclosure relates to obfuscating programs running on a virtual machine.

BACKGROUND

A physical computing device may be configured to host software that executes programs and applications. The software may also be configured to host virtual machines. The virtual machines may be configured to run their own operating systems (known as "guest operating systems") in order to execute programs and applications that are run by the virtual machines. Furthermore, the physical computing device may be configured to host a virtual machine manager (or "hypervisor") that manages the virtual machines. In some scenarios, when a program of one or more of the virtual machines attempts to perform a certain operation, the virtual machine manager may take over or "trap" the operation and may perform or "emulate" the operation. Thus, virtual machine managers are said to be able to perform trap-and-emulate operations for programs intended to be run by the virtual machines.

DESCRIPTION OF EXAMPLE EMBODIMENTS

Overview

Techniques are presented for obfuscating programs of virtual machines. On a virtual machine hosted by a physical device, a program is run that is configured to execute one or more operations. At a virtual machine manager hosted by the physical device and configured to manage the virtual machine, execution of the program is monitored to detect an obfuscated trapping event that causes the virtual machine manager to take over operation of the program. Upon detecting the obfuscated trapping event, a specific operation of the program is performed.

Example Embodiments

Figure 1:
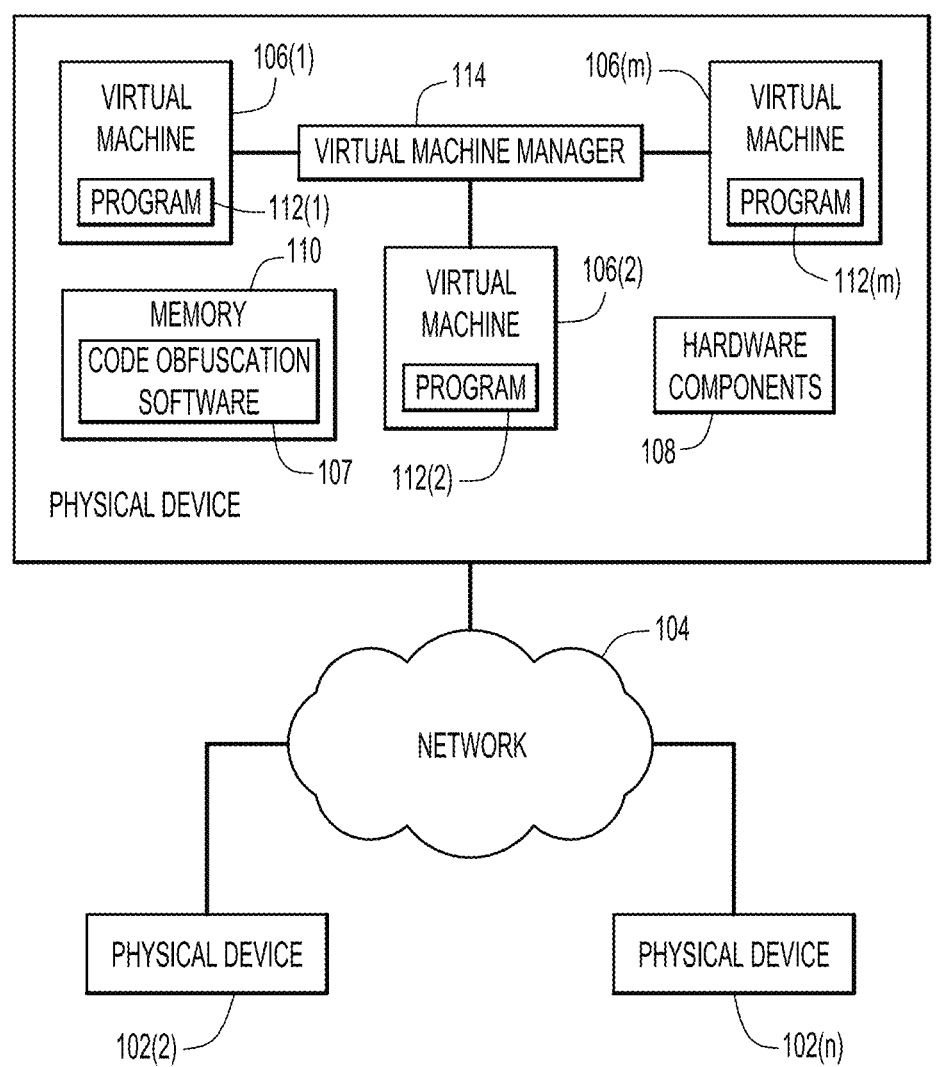
FIG. 1 shows an example system depicting physical devices that host a plurality of virtual machines and that have code obfuscation software.

The techniques described hereinafter relate to code obfuscation techniques of programs in virtual environments. Specifically, in one example, the techniques described hereinafter relate to code obfuscation for programs configured to perform operations on one or more virtual machines hosted by a physical device. An example system/network (hereinafter "system") is shown in FIG. 1 at reference numeral 100. The system 100 in FIG. 1 shows a plurality of physical devices 102(1)-102(n). The physical devices 102(1)-102(n) are connected to a network 104 and are configured to exchange messages with each other across the network 104. Each of the physical devices 102(1)-102(n) may be configured to host one or more virtual machines. For simplicity, FIG. 1 shows physical device 102(1) hosting virtual machines 106(1)-106(m), though it should be appreciated that any number of virtual machines may be hosted by any of the physical devices 102(1)-102(n). The virtual machines of the physical devices 102(1)-102(n) can also exchange communications with each other across the network 104.

In general, the virtual machines 106(1)-106(m) are hosted as a level of abstraction provided by an operating system of the physical device 102(1). That is, the physical device 102(1) may host hardware components, shown at reference numeral 108, and may also host software components stored in memory, shown at reference numeral 110. Memory 110 may also store code obfuscation software 107. The software components in the memory 110 are configured to instruct the hardware components 108 (e.g., a computer processor) to perform certain operations. For example, the physical device 102(1) may store in the memory 110 an operating system. The operating system of the physical device 102(1) may contain software for one or more programs or applications (hereinafter "programs") configured to perform specific tasks that are executed by the hardware components 108 upon proper instruction.

The operating system of the physical device 102(1) may also enable abstraction or emulated processes that may be performed by the physical device 102(1). For example, the operating system may enable abstractions for underlying operations of the hardware components 108 themselves (e.g., the operating system may emulate memory components of the physical device as "virtual memory"). In one example, the operating system may comprise an abstraction that emulates operations of an entire physical device, including, e.g., abstractions for physical memory, memory management units (e.g., page tables), input/output devices, etc. The abstractions for entire physical devices are known as "virtual machines." Just as the physical device 102(1) may run an operating system, the abstraction of a physical device (i.e., a virtual machine) can also run an operating system. Also, as stated above, there may be multiple abstractions for multiple physical devices, and thus, the operating system of the physical device 102(1) may run (or "host") multiple virtual machines simultaneously, as depicted in reference numerals 106(1)-106(m) in FIG. 1.

Each of the operating systems of the virtual machines 106(1)-106(m) is referred to as a "guest operating system" or "guest OS." The guest operating systems may be different operating systems for each virtual machine 106(1)-106(m). For example, the guest operating system of virtual machine 106(1) may be an iOS™ operating system, the guest operating system of virtual machine 106(2) may be an Android™ operating system and the guest operating system of virtual machine 106(3) may be a Windows™ operating system. Each of the guest operating systems of the virtual machines 106(1)-106(m) is configured to run one or more programs or applications. The programs are shown at reference numerals 112(1)-112(m) for corresponding virtual machines 106(1)-106(m).

Just as programs of the operating system of the physical device 102(1) may comprise instructions for the hardware components 108 to perform certain operations, the programs 112(1)-112(m) of the virtual machines 106(1)-106(m) may similarly comprise instructions for the hardware components 108 also to perform certain operations. However, at times, the instructions contained within the programs 112(1)-112(m) may conflict with one another, and as a result, the instructions contained within the programs 112(1)-112(m) may attempt to access some of the same hardware components 108 at the same time. In a traditional operating system (i.e., one operating system per physical device), the operating system itself arbitrates access to the hardware components 108. However, when there are multiple operating systems (e.g., multiple guest operating systems), each guest operating system may believe that it, and it alone, is in charge of the hardware components 108. In this example, the virtual machine manager 114 arbitrates access to the hardware components 108 between the multiple guest operating systems. In other words, when there are multiple operating systems of a physical device, the instructions in the programs 112(1)-112(m) may be attempting to perform normally valid operations, but because the programs are sharing the same hardware 108, their access needs to be arbitrated by the virtual machine manager 114. The instructions contained within the programs 112(1)-112(m) may attempt to access one or more of the hardware components 108 of the physical device 102(1) that is only accessible via the operating system of the physical device. In these instances, the guest operating system would normally be the function that performs the arbitration between multiple programs. However, in a virtualized environment, this arbitration is complicated by the fact that several operating systems, all believing that they have exclusive access to the hardware, conflict with each other over the shared hardware components 108.

In order to address these problems, the operating system of the physical device 102(1) may be configured, in some instances, to "take over" control of the guest operating systems of the virtual machines 106(1)-106(m) to perform the operations on behalf of the guest operating system. In one example, the operating system of the physical device 102(1) is configured as a virtual machine manager, shown at reference numeral 114 in FIG. 1. The virtual machine manager 114 is configured to manage the virtual machines 106(1)-106(m) and to operate as an intermediary between the virtual machines 106(1)-106(m) and the hardware components 108 of the physical device 102(1) on which the virtual machines 106(1)-106(m) are hosted. The virtual machine manager 114 is also known as a "hypervisor."

This operation of "taking over" control from the guest operating system is known as a "trap and emulate" operation. That is, upon trapping the guest operating system, the virtual machine manager 114, itself, will execute the intended operation by emulating the execution of the operations in software. Such operations are called "trap-and-emulate" operations that are performed by the virtual machine manager 114. In certain instances, the virtual machine manager 114 is configured to monitor and evaluate the code executed in the guest operating systems, and determine whether or not to perform a trap-and-emulate operation. These techniques described in detail hereinafter.

Often times, it is advantageous to implement security techniques to ensure that the code of the executed operations in the programs 112(1)-112(m) of the virtual machines 106(1)-106(m) (and the programs of the physical device 102(1) itself) is secure and unable to be tampered with by an outside (e.g., malicious) entity. For example, it may be advantageous to obfuscate the code of the programs of the virtual machines such that during static analysis of the code, the logical flow of executed operations would be hidden or otherwise concealed. One known technique of code obfuscation is "control flow obfuscation," where the logical sequence of operations of a program code appears as incoherent and/or difficult (if not, impossible) to follow by an outside/unauthorized entity. These control flow obfuscation techniques can sufficiently obfuscate the code of a program such that, upon a static analysis of the code, the outside/unauthorized entity cannot easily determine the operations and sequence of operations performed by the program. The difficulty of analysis can be increased (typically at the detriment of runtime performance) to arbitrary limits, allowing the cost of reverse engineering the code to easily exceed the gains of doing so.

In the virtualization environment, where the virtual machine manager 114 performs trap-and-emulate operations, the code of the programs of the virtual machines can be further obfuscated such that during a static analysis of the code, the trap-and-emulate operations themselves are subverted for non-traditional purposes. That is, in one example, the virtual machine manager 114 may have prior knowledge and/or synchronization (e.g., a priori information) with the programs 112(1)-112(m) running on the virtual machines 106(1)-106(m). As a result, the virtual machine manager 114 can monitor the code being executed in order to perform trap-and-emulate operations. For example, the virtual machine manager 114 may detect a trapping event in the execution of a program's operation, and upon such detection, the virtual machine manager 114 may perform the trap-and-emulate operation to ensure that the corresponding operation in the program is executed.

As will become apparent hereinafter, the trapping event may be a typical trapping event (e.g., an emulation of a valid operation) or may be an obfuscated or non-traditional trapping event. When the trapping event is a typical trapping event, the trapping event may be events that are typically always trappable by the virtual machine manager 114 such that the virtual machine manager 114 performs a trap-and-emulate operation. When the trapping event is an obfuscated or non-traditional trapping event, the virtual machine manager 114 may perform a trap-and-emulate operation that it otherwise would not perform without prior knowledge or synchronization with the virtual machines 106(1)-106(m). One example of an obfuscated or non-traditional trapping event is the occurrence of a request to access a particular memory location of the physical device 102(1). The request for access to the particular memory location may trigger a trap-and-emulate operation to be performed by the virtual machine manager 114. In this example, a static analysis of the code would only indicate the request to access the memory location, and the static analysis would not reveal that the request to access the memory location actually triggered a trap-and-emulate operation performed by the virtual machine manager. In general, the term "obfuscated trapping event" or "obfuscated trapping operation" as used herein may be used to differentiate a trap-and-emulate operation that is used specifically to affect a non-traditional operation, as opposed to a normal trapping event which is used for traditional operations. In other words, to an outside entity, the obfuscated or non-traditional trapping event may not be easily detectable via a static analysis of the program code. Instead, the static analysis would indicate a normal, functional operation that might not otherwise trigger a trap-and-emulate operation by the virtual machine manager 114, or one that, while triggering a trap-and-emulate operation, would not ordinarily be associated with the actual events that the obfuscated trapping operation affects. Thus, the trap-and-emulate operations (e.g., triggered by traditional and/or obfuscated trapping events) performed by the virtual machine manager 114, as described by the techniques hereinafter, leads to obfuscation of the program code since seemingly operable or executable program operations that would not otherwise trigger a trap-and-emulate operation now may do so, or seemingly normal trappable operations take on non-traditional behaviors. This may result in the virtual machine manager 114 performing specific operations of a program that differs from an operation implied by static analysis of the program.

Figure 2:
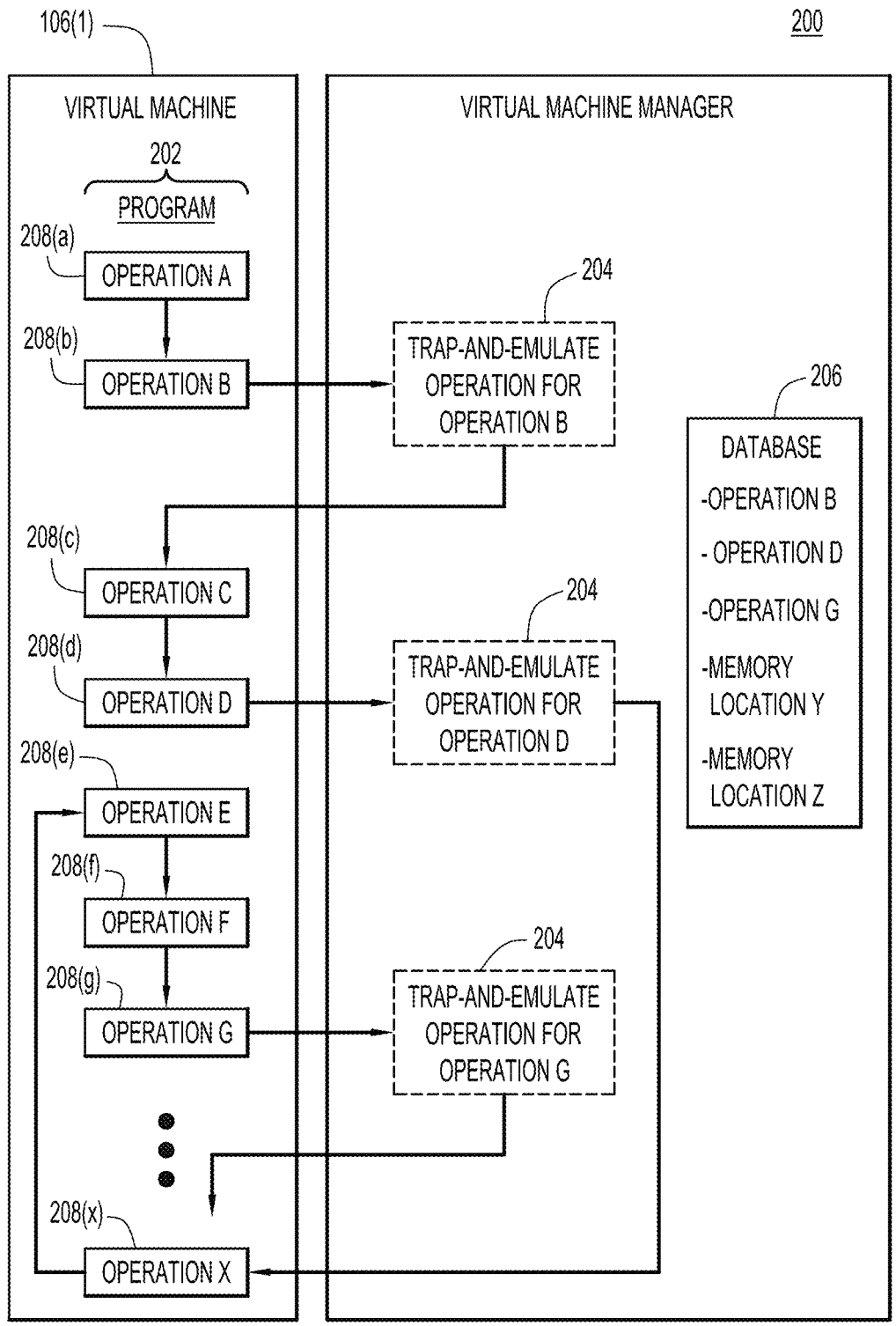
FIG. 2 shows an example of trap-and-emulate operations performed by a virtual machine manager in response to an obfuscated trapping event.

Reference is now made to FIG. 2. FIG. 2 shows an example of trap-and-emulate operations 200 performed by the virtual machine 114 in response to trapping events (e.g., "trapping operations"). FIG. 2 depicts a representation, at 202, of a logical flow associated with a program code of one of the virtual machines 106(1)-106(m) (e.g., virtual machine 106(1)). FIG. 2 also depicts, at 204, a representation of trap-and-emulate operations performed by the virtual machine manager 114 according to the techniques herein. The virtual machine manager 114 also maintains a list or database 206 that contains all of the trapping events in the logical flow 202 of the code. For example, the logical flow 202 may comprise a series of program operations to be executed, and the database 206 may contain a list of operations in the code that are non-traditional or obfuscated trapping events that cause the virtual machine manager 114 to perform a trap-and-emulate operation. Additionally, the database 206 may contain a list of memory locations (shown as "Memory Location Y" and "Memory Location Z" in FIG. 2) that, upon a request by a program operation, trigger a trap-and-emulate operation. In other words, the database 206 may contain a list of trapping events (traditional or obfuscated) themselves and/or may contain a list of memory locations that trigger trap-and-emulate operations. Thus, it should be appreciated that the operations depicted in FIG. 2 may trigger trap-and-emulate operations by, for example, requesting access to one or more of the memory locations listed in the database 206.

It should be appreciated that the database 206 may contain only non-traditional trapping events, since other trapping events would trigger a trap-and-emulate operation by the virtual machine manager 114 regardless. In one example, the database 206 may be implemented by a processor and may contain a list of trappable events. Additional software code may be added to the trappable events (e.g., by the virtual machine manager 114), and the added software code may differ significantly from the traditional software assigned to the trappable events, thus resulting in operations that are not easily ascertained through a static analysis of the program and software code of the trappable event itself. For example, a program code of one or more of the virtual machines 106(1)-106(m) may be supplied a priori to the virtual machine manager 114, together with the particular obfuscated or non-traditional trapping events that are present within the program code. As stated above, the obfuscated or non-traditional trapping events may be operations that otherwise appear as functioning operations during a static analysis of a program code. Thus, the virtual machine manager 114 may need to be "informed" before execution of the program as to which seemingly functional operations in a program code are actually intended to trigger trap-and-emulate operations (e.g., which functional operations in a program code are obfuscated trapping events). In one example, the programmer of the code may supply this information to the virtual machine manager 114 a priori (prior to compilation or execution of the program). In FIG. 2, for example, the program code represented by the logical flow 202 may have been supplied to the virtual machine manager 114 prior to the program code being compiled or executed, and when the program code was supplied to the virtual machine manager 114, an indication may have also been provided to the virtual machine manager 114 that Operation B, Operation D and Operation G are intended to be trapping operations (and/or that Memory Location Y and Z are intended to trigger trapping operations upon a request by a program) that trigger trap-and-emulate events. Without this information, the virtual machine manager 114 may not otherwise be aware that Operation B, Operation D and Operation G are trapping operations and, as a result, may incorrectly execute operations without this prior knowledge. Thus, upon receiving the information about the obfuscated trapping operations within a program code, the virtual machine manager 114 can store these trapping operations in the database of trapping operations 206 and can perform the appropriate trap-and-emulate operations when the program is executed.

As shown in FIG. 2, the logical flow 202 lists program operations 208(a)-208(x). Operation 208(a) is referred to hereinafter as "Operation A," operation 208(b) is referred to hereinafter as "Operation B," and so on. It should be appreciated that operations 208(a)-208(x) may comprise any known or heretofore contemplated program operations that are coded in known programming languages. Operations 208(a)-208(x) may also comprise certain logical structures (e.g., "for" loops, "while" loops, link-lists, etc.) that comprise portions of the logical flow 202 of the program code. FIG. 2 shows some operations 208(a)-208(x) occurring sequentially (that is, Operation B occurs after Operation A has been performed, Operation C occurs after Operation B has been performed, and so on), though it should be appreciated that any order of execution of the operations 208(a)-208(x) may be present in the logical flow 202 of the code.

As shown in FIG. 2, the database 206 lists Operation B, Operation D and Operation G as trapping events that, upon detection, trigger a trap-and-emulate operation by the virtual machine manager 114. Trapping events may also be referred to hereinafter as trapping operations. Operation B, Operation D and Operation G are program operations that trigger a trap-and-emulate operation (e.g., traditional trapping operations or obfuscated trapping operations that may request access to memory locations that trigger trap-and-emulate operations). However, accordingly to the techniques herein, since the virtual machine manager 114 has prior knowledge of the program code and/or synchronizing with the virtual machine that runs the program code, the virtual machine manager 114 is able to specially handle the trap-and-emulate functionality associated with these operations. In other words, Operation B, Operation D and Operation G are considered non-traditional or obfuscated trapping operations/trapping events. Thus, an outside entity that evaluates the logical flow 202 of the program code would, at best, not be aware that the program code contains any trapping operations, or in a worst case would simply dismiss the operations as normally-handled trap-and-emulate operations.

For simplicity, the program is described herein as being executed by the guest operating system of virtual machine 106(1) and the virtual machine manager 114 is monitoring execution of the operations shown in the logical flow 202 of the program code. The program initially points to Operation A for execution. Since Operation A is not a trapping operation listed in the database 206, the virtual machine 106(1) executes Operation A. The program then points to Operation B. Since Operation B is a trapping operation (e.g., it is listed in the database 206 of trapping operations), the virtual machine manager 114, upon detecting Operation B performs a trapping event to take over the operations of the guest operating system of the virtual machine 106(1). As will be described herein after, upon taking over or "trapping" the guest operating system, the virtual machine manager 114 can emulate Operation B in several ways. For example, the virtual machine manager 114 can instruct the virtual machine 106(1) to execute Operation B as if there was no trapping that occurred. Additionally, the virtual machine manager 114 can execute Operation B itself and return the result of the operation to the virtual machine 106(1). It should be appreciated that the execution of Operation B upon the trapping may mirror the intended execution of Operation B in the logical flow 202 or may be an operation that is different from the intended execution of Operation B in the logical flow 202. For example, Operation B may be an "input" operation, and the trap-and-emulate operation for Operation B may also be an "input" operation or may be a different (e.g., a "subtraction") obfuscated operation. Furthermore, Operation B executed after the trapping event may be a "null" operation, whereby no operation is performed.

After the trap-and-emulate operation is performed for Operation B, the result is returned to the virtual machine 106(1), and the program then points to Operation C. Since Operation C is not a trapping operation listed in the database 206, the virtual machine 106(1) executes Operation C. The program then points to Operation D. Since Operation D is a trapping operation (e.g., it is listed in the database 206 of trapping operations), the virtual machine manager 114, upon detecting Operation D performs a trapping event to take over the operations of the guest operating system of the virtual machine 106(1) in a similar manner as that described for Operation B, above. However, in this example, when Operation D is emulated by the virtual machine manager 114, the virtual machine manager 114 returns the result of Operation D to a different out-of-order execution of operations. This out-of-order execution is shown by Operation X, at 208(x) in the logical flow 202. When the result of Operation D is returned out-of-order, the program points to Operation X and the virtual machine 106(1) executes it (since it is not in the database 206) and then points to Operation E. This out-of-order execution acts as an additional layer of obfuscation. Among other things, an outside entity would not be able to glean from a static analysis of the program code that (1) Operation D was performed via a non-traditional trap-and-emulate operation and (2) that Operation X was performed before Operation E. The out-of-order execution is different from the in-order execution of operations, where the result of a trap-and-emulate operation is returned in sequence. For example, Operation B is returned in-order since upon returning the result of the trap-and-emulate operation for Operation B, the program points to Operation C.

Continuing further, the program points to Operation E, and since Operation E is not a trapping operation listed in the database 206, the virtual machine 106(1) executes it. The program then points to Operation F and executes it since it also is not in the database 206. Afterwards, the program points to Operation G, which is a trapping operation listed in the database 206. A trap-and-emulate operation for Operation G is performed by the virtual machine manager, and the result is returned to the virtual machine 106(1) (e.g., in-order as with Operation B or out-of-order as with Operation D).

Thus, as shown in FIG. 2, the virtual machine manager 114 can trap-and-emulate certain operations of the program without the underlying implementation of the trap-and-emulate operations being revealed in a static analysis of the program code.

Figure 3A:
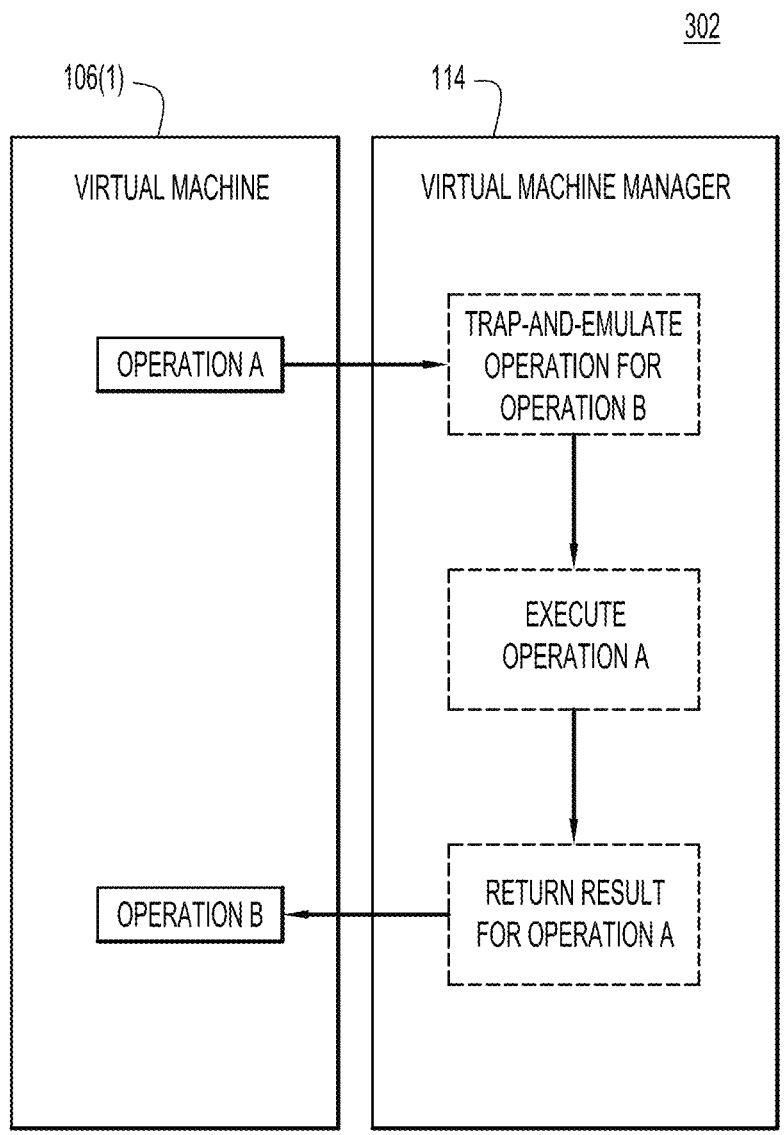
FIGS. 3A-3C show example responses from the virtual machine manager in response to performing the trap-and-emulate operations.
Figure 3B:
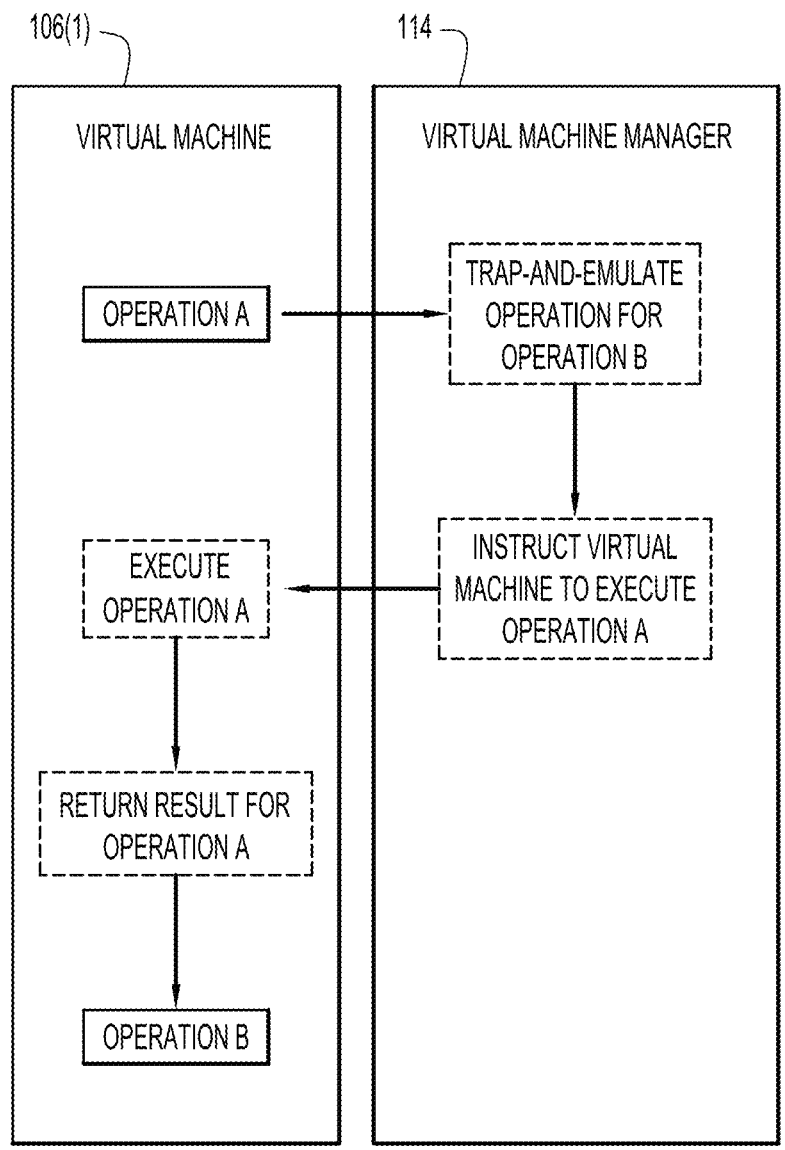
Figure 3C:
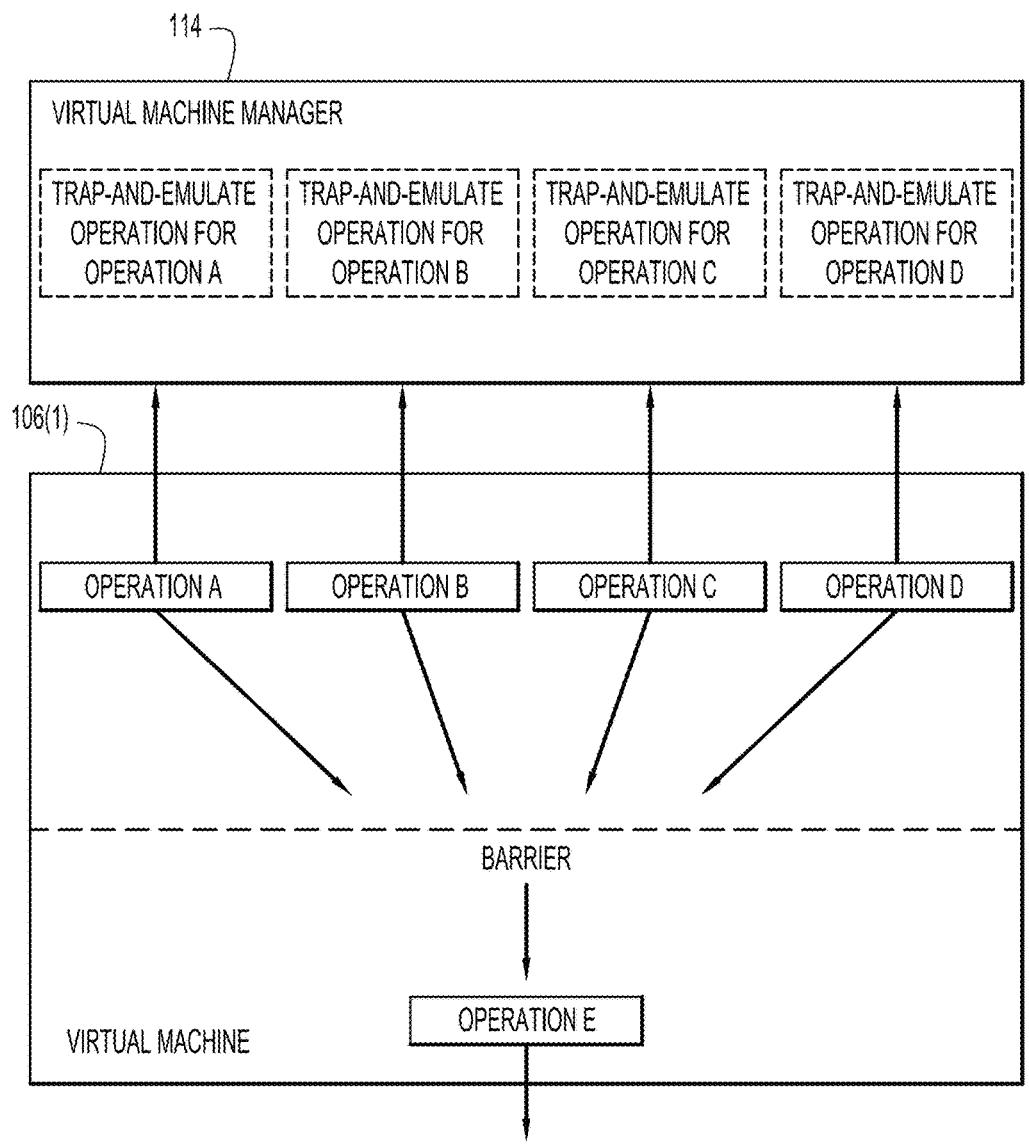

FIGS. 3A-3C show example responses from the virtual machine manager 114 in response to performing the trap-and-emulate operations. As stated above, the virtual machine manager 114 is configured to perform trap-and-emulate operations in response to detecting obfuscated or non-traditional trapping operations in the execution of a program, and the trap-and-emulate operations can help obfuscate operation of code under static analysis as described above. FIGS. 3A-3C show examples of the different code obfuscation techniques that may be deployed as part of the trap-and-emulate operations performed by the virtual machine manager 114. For all of these examples, it should be assumed that the virtual machine manager 114 has detected an obfuscated or otherwise non-traditional trapping operation during execution of the code of the program.

FIG. 3A shows an obfuscation technique at 302 (e.g., a control flow obfuscation) that is achieved by the virtual machine manager 114 causing the executed code to jump to a different memory page upon detecting the trapping operation and performing the trap-and-emulate operation. For example, the virtual machine manager 114 will take control of the program and will execute the intended operation represented in the trapping event itself. Upon executing the intended operation, the virtual machine manager 114 will return control to the program. For example, a program may wish to call a subroutine to add two numbers together (e.g., Operation A in FIG. 3A). The virtual machine manager 114 may detect (e.g., through a priori knowledge of the program code) that the addition operation is actually an obfuscated/non-traditional trapping operation. As a result, the virtual machine manager 114 performs a different operation, e.g., subtraction, of the two numbers and modifies the program's environment so that it appears that the operation has been returned by operation of the code itself. In this example, the trapping operation is obfuscated because a static analysis of the program code would show the program as performing a certain operation (e.g., the adding operation of Operation A) when in fact the virtual machine manager 114 has performed a completely different operation. In one example, the program, using only static analysis, appears to call a subroutine to add two numbers together. The virtual machine manager 114 has, however, arranged for a trap-and-emulate to occur at the first instruction of the subroutine being called. The functionality undertaken by the virtual machine manager 114 as part of the emulation may then be any arbitrary action (e.g., for simplicity, subtraction of the two numbers, instead of addition). Thus, the target subroutine (available to static analysis) is in fact a decoy function that is different from the actual intended operation.

FIG. 3B shows another example of code obfuscation at 304 deployed by the virtual machine manager 114. In FIG. 3B the virtual machine manager 114 may detect a trapping event (e.g., an input operation shown as Operation A in FIG. 3B), and upon detecting the trapping event, the virtual machine manager 114 may take over the program and may instruct the virtual machine itself to perform the obfuscated operation (e.g., addition). Upon performing the adding operation, the program code may have another trapping event associated with returning the result of the adding operation. Again, the virtual machine manger 114, upon detecting this trapping event, will take over the program and may either return the result itself or may instruct the virtual machine to return the result. Thus, in this example, the actual operation is being performed by the virtual machine hosting the program itself, and not by the virtual machine manager.

In another example, a sequence or series of obfuscated trapping events may be present in the program code. The virtual machine manager 114 may or may not perform the specific operation based on the particular sequence of the obfuscated trapping events. Thus, separate "enabling" or "disabling" trapping events may be embedded in the program code to affect whether or not subsequent operations are trapped by the virtual machine manager 114. This priming activity or sequence could be located "far away" from the trappable code sequence. In another example, the virtual machine manager 114 may keep track of or count a number of instances of a predetermined (obfuscated or non-traditional) trapping event and may perform the specific operation of the program if the number of times that the obfuscated trapping event has been detected is greater than a predetermined threshold number.

FIG. 3C shows an example of a synchronization of trapping events at 306. FIG. 3C may represent a Portable Operating System Interface (POSIX) environment. In the POSIX environment, multiple operations (e.g., "threads") may be executed independently. These multiple operations may, however, need to eventually synchronize at a "barrier" before another operation is performed. For example, as shown in FIG. 3C, Operations A, B, C and D may be performed independently (e.g., by independent cores of a quad-core processor), but before Operation E is performed, Operations A-D need to be synchronized with each other. In one example, all of the Operations A-D are obfuscated trapping operations, and one of the operations in particular may be a different obfuscated trapping operation from the others. The virtual machine manager 114 takes over the program to perform the trap-and-emulate operations for each one of the Operations A-D, but only one is designated as a "master" operation (e.g., Operation D in FIG. 3C). The master operation synchronizes the series of operations with respect to it such that all of the operations are performed before the operation at the barrier (Operation E) is performed.

Figure 4:
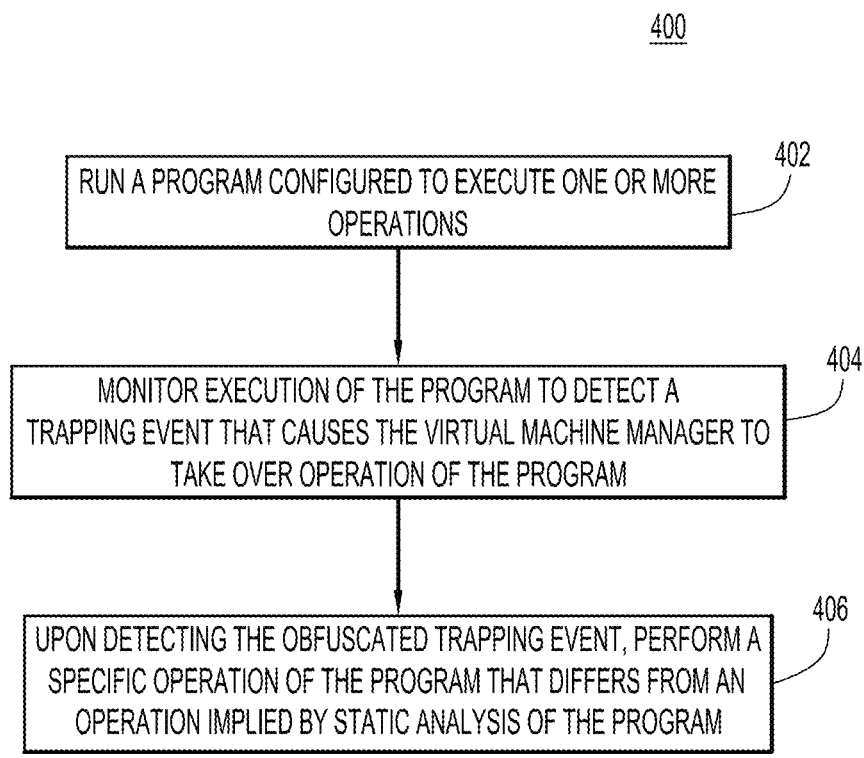
FIG. 4 shows an example flow chart depicting a sequence of operations that trigger the trap-and-emulate operation performed by the virtual machine manager.

Reference is now made to FIG. 4. FIG. 4 shows a flow chart 400 that depicts a sequence of operations that trigger the trap-and-emulate operations performed by the virtual machine manager 114. At reference numeral 402, a program configured to execute one or more operations is run on a virtual machine. At reference numeral 404, the virtual machine manager 114 monitors execution of the program to detect an obfuscated trapping event that causes the virtual machine manager to take over operation of the program. At operation 406, upon detecting the obfuscated trapping event, the specific operation of the program is performed. As described above, this operation may be performed by the virtual machine manager 114 or by the virtual machine hosting the program. Also, as described above, the specific operation of the program may be performed such that the operation performed differs from an operation implied by static analysis of the program.

Figure 5:
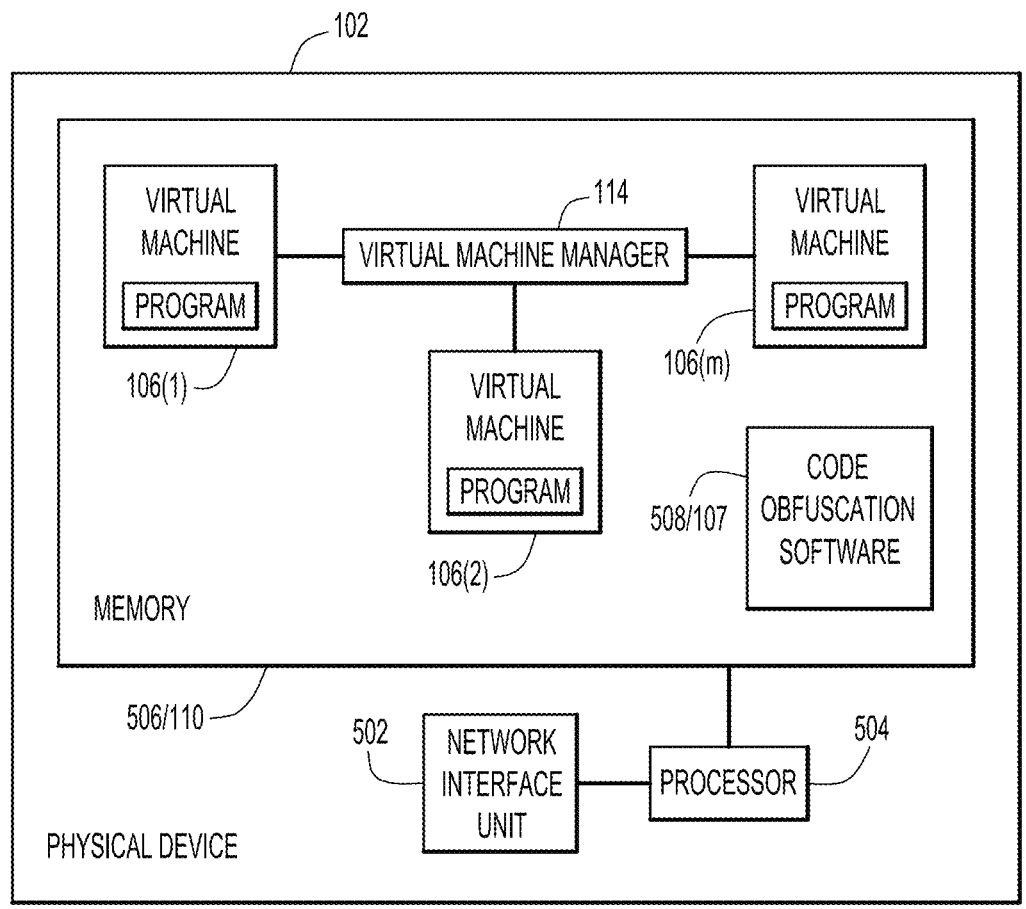
FIG. 5 shows an example block diagram of the physical device with software configured to perform obfuscation techniques.

Reference is now made to FIG. 5, which shows an example block diagram of the physical device with software configured to perform obfuscation techniques. The physical device in FIG. 5 is shown at reference numeral 102, though it should be appreciated that the physical device 102 may represent any of the physical devices in FIG. 1. Physical device 102 comprises, among other units, a network interface unit 502, a processor 504 and a memory 506.

The network interface unit 502 is configured to send and receive communications (e.g., data packets and other communications) to devices in the system 100. The processor 504 is, for example, a microprocessor or microcontroller that is configured to execute program logic instructions (i.e., software) for carrying out various operations and tasks of the physical device 102, as described herein. For example, the processor 504 is configured to execute the code obfuscation software 508 in the memory 506 to obfuscate the operations of the code of programs. The functions of the processor 504 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 506 may comprise read only memory (ROM), random access memory (RAM), magnetic disk storage media devices, optical storage media devices, flash memory devices, electrical, optical, or other physical/tangible (non-transitory) memory storage devices. The memory 506 stores instructions for the code obfuscation software 508. Thus, in general, the memory 506 may comprise one or more computer readable storage media (e.g., a memory storage device) encoded with software comprising computer executable instructions and when the software is executed (e.g., by the processor 502) it is operable to perform the operations described herein.

The memory 506 also stores the virtual machine manager 114 and one or more virtual machines 106(1)-106(m). As described above, the virtual machine manager 114 is configured to manage the virtual machines 106(1)-106(m) and is configured to perform trap-and-emulate operations, as described herein. The virtual machines 106(1)-106(m) are configured to run programs 112(1)-112(m).

The code obfuscation software 508 may take any of a variety of forms, so as to be encoded in one or more tangible computer readable memory media or storage device for execution, such as fixed logic or programmable logic (e.g., software/computer instructions executed by a processor), and the processor 502 may be an application specific integrated circuit (ASIC) that comprises fixed digital logic, or a combination thereof.

In still another example, the processor 502 may be embodied by digital logic gates in a fixed or programmable digital logic integrated circuit, which digital logic gates are configured to execute the code obfuscation software 508. In general, the code obfuscation software 508 may be embodied in one or more computer readable storage media encoded with software comprising computer executable instructions and when the software is executed operable to perform the operations described above.

It should be appreciated that the techniques described above in connection with all embodiments may be performed by one or more computer readable storage media that is encoded with software comprising computer executable instructions to perform the methods and steps described herein. For example, the operations performed by the physical device 102 may be performed by one or more computer or machine readable storage media (e.g., non-transitory) or device executed by a processor and comprising software, hardware or a combination of software and hardware to perform the techniques described herein.

In summary, a method is provided comprising: on a virtual machine hosted by a physical device, running a program configured to execute one or more operations; at a virtual machine manager hosted by the physical device and configured to manage the virtual machine, monitoring execution of the program to detect a trapping event that causes the virtual machine manager to take over operation of the program; and upon detecting at the virtual machine manager the trapping event, performing a specific operation of the program that differs from an operation implied by static analysis of the program.

In addition, one or more computer readable storage media is provided that is encoded with software comprising computer executable instructions and when the software is executed operable to: run a program configured to execute one or more operations; monitor execution of the program to detect a trapping event that causes a virtual machine manager to take over operation of the program; and upon detecting at the virtual machine manager the trapping event, perform a specific operation of the program that differs from an operation implied by static analysis of the program.

Furthermore, an apparatus is provided comprising: a network interface unit; a memory; and a processor coupled to the network interface unit and the memory and configured to: run a program configured to execute one or more operations; monitor execution of the program to detect a trapping event that causes a virtual machine manager to take over operation of the program; and upon detecting at the virtual machine manager the trapping event, perform a specific operation of the program that differs from an operation implied by static analysis of the program.

The above description is intended by way of example only.

What is claimed is:

1. A method comprising:
on a virtual machine hosted by a physical device, running a program configured to execute one or more operations;
at a virtual machine manager hosted by the physical device and configured to manage the virtual machine, monitoring execution of the program to detect an obfuscated trapping event that causes the virtual machine manager to take over operation of the program; and
upon detecting at the virtual machine manager the obfuscated trapping event, performing, by the virtual machine manager, a specific operation that differs from an operation implied by static analysis of the program, wherein the virtual machine manager maintains a list of operations of the program that correlate with obfuscated trapping events, wherein the specific operation is known to the virtual machine manager prior to the program being executed and wherein the specific operation is an operation that the virtual machine manager would not otherwise perform as a result of executing the program.

2. The method of claim 1, wherein performing comprises, at the virtual machine manager, taking control of the program to perform the specific operation.

3. The method of claim 1, further comprising, performing the specific operation in an out-of-order execution sequence of operations of the program.

4. The method of claim 1, further comprising, performing the specific operation in an in-order execution sequence of operations of the program.

5. The method of claim 1, wherein performing comprises, at the virtual machine manager, taking control of the program to perform the specific operation such that it appears that the specific operation is performed by the virtual machine.

6. The method of claim 1, further comprising:
keeping track of a number of instances of a predetermined trapping events; and
performing the specific operation of the program if the number of instances that one or more of the predetermined trapping events matches a certain pattern known to the virtual machine manager.

7. The method of claim 1, wherein performing comprises:
at the virtual machine manager, taking control of the program to perform the specific operation; and
performing the specific operation so that it appears that an operation different from the specific operation is performed.

8. The method of claim 1, further comprising:
at the virtual machine manager, monitoring execution of the program to detect a series of trapping events corresponding to a series of threads; and
controlling execution of the threads based on a known sequence of trapping events.

9. The method of claim 1, further comprising:
at the virtual machine manager, monitoring execution of the program to detect a sequence of trapping events; and
determining from the sequence of trapping events whether or not to perform the specific operation.

10. The method of claim 1, wherein monitoring comprises monitoring execution of the program to detect the obfuscated trapping event that requests access to a particular memory location known to the virtual machine manager as triggering a trap-and-emulate operation.

11. One or more non-transitory computer readable storage media encoded with software comprising computer executable instructions and when the software is executed operable to:
run a program configured to execute one or more operations;
monitor execution of the program to detect an obfuscated trapping event that causes a virtual machine manager to take over operation of the program; and
upon detecting at the virtual machine manager the obfuscated trapping event, perform, by the virtual machine manager, a specific operation that differs from an operation implied by static analysis of the program, wherein the virtual machine manager maintains a list of operations of the program that correlate with obfuscated trapping events, wherein the specific operation is known to the virtual machine manager prior to the program being executed and wherein the specific operation is an operation that the virtual machine manager would not otherwise perform as a result of executing the program.

12. The non-transitory computer readable storage media of claim 11, wherein the instructions operable to perform the specific operation of the program comprise instructions operable to take control, at the virtual machine manager, of the program to perform the specific operation.

13. The non-transitory computer readable storage media of claim 12, further comprising instructions operable to perform, at the virtual machine, the specific operation in an out-of-order execution sequence of operations upon receiving the instruction from the virtual machine manager.

14. The non-transitory computer readable storage media of claim 12, further comprising instructions operable to perform, at the virtual machine, the specific operation in an in-order execution sequence of operations upon receiving the instructions from the virtual machine manager.

15. The non-transitory computer readable storage media of claim 11, wherein the instructions operable to perform the specific operation of the program comprise instructions operable to take control, at the virtual machine manager, of the program to perform the specific operation such that it appears that the specific operation is performed by the virtual machine.

16. An apparatus comprising:
a network interface unit;
a memory; and
a processor coupled to the network interface unit and the memory and configured to:
run a program configured to execute one or more operations;
monitor execution of the program to detect an obfuscated trapping event that causes a virtual machine manager to take over operation of the program; and
upon detecting at the virtual machine manager the obfuscated trapping event, perform, by the virtual machine manager, a specific operation that differs from an operation implied by static analysis of the program, wherein the virtual machine manager maintains a list of operations of the program that correlate with obfuscated trapping events, wherein the specific operation is known to the virtual machine manager prior to the program being executed and wherein the specific operation is an operation that the virtual machine manager would not otherwise perform as a result of executing the program.

17. The apparatus of claim 16, wherein the processor is further configured to
keep track of a number of instances of a predetermined trapping events; and
perform the specific operation of the program if the number of instances that one or more of the predetermined trapping events matches a certain pattern known to the virtual machine manager.

18. The apparatus of claim 16, wherein the processor is further configured to monitor execution of the program to detect the obfuscated trapping event that requests to a particular memory location known to the virtual machine manager.

* * * * *